US007613553B1

(12) United States Patent
Benjamin

(10) Patent No.: US 7,613,553 B1
(45) Date of Patent: Nov. 3, 2009

(54) UNMANNED VEHICLE CONTROL SYSTEM

(75) Inventor: Michael R. Benjamin, Boston, MA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 1156 days.

(21) Appl. No.: 10/911,765

(22) Filed: Jul. 30, 2004

Related U.S. Application Data

(60) Provisional application No. 60/491,489, filed on Jul. 31, 2003.

(51) Int. Cl.
*G08G 9/02* (2006.01)
*G01C 22/00* (2006.01)
*G05B 19/18* (2006.01)

(52) U.S. Cl. .......................... 701/26; 701/27; 701/301; 700/250; 700/253

(58) Field of Classification Search .................. 701/26, 701/27, 300, 301; 700/253, 248, 246, 250; 235/400
See application file for complete search history.

(56) References Cited

U.S. PATENT DOCUMENTS 4,862,373 A * 8/1989 Meng ........................ 701/209
4,947,350 A * 8/1990 Murray et al. .............. 702/181
6,175,803 B1 * 1/2001 Chowanic et al. ........... 701/209
6,650,965 B2 * 11/2003 Takagi et al. ............... 700/245
6,711,467 B2 * 3/2004 Inoue et al. ................ 700/245
2004/0162638 A1 * 8/2004 Solomon .................... 700/247

OTHER PUBLICATIONS

Michael R. Benjamin, Underwater Vehcile Control: Minimum Requirements for a Robust Decision Space, Jun. 2000, Command & Control Research & Technology Symposium 2000, Monterey, CA.*
Julio K. Rosenblatt, Maximising Expected Utility for Behaviour Arbitration, 1999, Lecture Notes in Computer Science; vol. 1747, Proceedings of the 12th Australian Joint Conference on Artificial Intelligence: Advanced Topics in Artificial Intelligence.*
Paolo Pirjanian, Mutiple Objective Action Selection and Behavior Fusion Using Voting, PhD Dissertation, 1998, Aalborg University, Denmark.
Julio K. Rosenblatt, DAMN: a Distributed Architecture for Mobile Navigation, Techanical paper, Carnegie Mellon University, USA.
Jukka Riekki, Reactive Task Execution of A Mobile Robot, Dissertation, 1999, pp. 40-60, University of Oulu, Finland.

* cited by examiner

*Primary Examiner*—Thomas G Black
*Assistant Examiner*—Christine M Behncke
(74) *Attorney, Agent, or Firm*—James M. Kasischke; Michael P. Stanley; Jean-Paul A. Nasser

(57) ABSTRACT

A method for autonomously controlling a vehicle includes establishing decision variables for maneuvering the vehicle. Behavior functions are established for behaviors of the vehicle as a function of at least one of the established decision variables. These behavior function give a score which may be weighted, indicating the desirability of engaging in the associated behavior. A summation of the weighted behavior functions can be solved while the vehicle is operating to determine the values of the decision variables giving the highest summation of scores. In a preferred method, an optimal structure for the behavior functions and summation solution is taught. The method then guides the vehicle in accordance with the determined decision variable values.

18 Claims, 4 Drawing Sheets

```
All-Pairs Shortest Path()
setDirectPieces()
threshCount = 0
while(threshCount < 100)
      sampleFrontier(50)
      pqueue!extract-max(pc_a, pc_b )
      val = refine(pc_a, pc_b )
      if(val < thresh)
              threshCount = threshCount + 1
      else
              threshCount = 0
```

FIG. 5

UNMANNED VEHICLE CONTROL SYSTEM

This application claims the benefit of U.S. Provisional Application No. 60/491,489, filed Jul. 31, 2003 and which is entitled MULTI OBJECTIVE OPTIMIZATION MODEL FOR VEHICLE CONTROL by Michael R. Benjamin.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The invention relates to a vehicle control system for autonomously piloting a vehicle utilizing a multi-objective optimization method that evaluates a plurality of objective functions to determine the best decision variables satisfying those objectives.

(2) Description of the Prior Art

The mission assigned to an underwater vehicle strongly shapes the navigation complexity and criteria for success. While many problems are similar between commercial and military AUVs, there is a stronger emphasis in military vehicles in reasoning about other nearby moving vessels. Military AUVs (more commonly referred to as unmanned underwater vehicles (UUVs)) are typically designed to operate in congested coastal situations, where a near-collision or mere detection by another vessel can jeopardize the AUV. The scenario considered in this application therefore centers around the need to consider preferred relative positions to a moving contact, while simultaneously transiting to a destination as quickly and directly as possible. By "preferred relative position", we primarily mean collision avoidance, but use this term also in reference to other objectives related to relative position. These include the refinement of a solution on a detected contact, the avoidance of detection by another contact, and the achievement of an optimal tactical position should an engagement begin with the contact.

Other researchers have submitted material in the art of autonomous vehicle navigation.

Rosenblatt in "DAMN: A Distributed Architecture for Mobile Navigation," PhD thesis, Carnegie Mellon University, 1997 teaches the use of behavior functions voting on a single decision variable with limited variation. Multiple behavior functions provide votes for an action having five different possibilities. Additional control is provided by having a mode manager that dynamically adjusts the weights of the behavior functions. While Rosenblatt indicates that decision variables for turns and speed are desirable, coupling of these two decision variables into a single control system at the same time is not provided.

Riekki in "Reactive Task Execution of a Mobile Robot," PhD Thesis, University of Oulu, 1999, teaches action maps for each behavior that can be combined to guide a vehicle using multiple decision variables. Riekki discloses action maps for obstacle avoidance and velocity.

These publications fail to teach the use of multiple decision variables having large numbers of values. No method is taught for determining a course of action in real time from multiple behavior functions. Furthermore, these publications do not teach the use of action duration as a decision variable.

SUMMARY OF THE INVENTION

This invention provides a method for autonomously controlling a vehicle. This includes comprising establishing decision variables for maneuvering the vehicle and behavior functions associated with the decision variables. The behavior functions give a score indicating the desirability of engaging in the associated behavior. The behavior functions are weighted. A summation of the weighted behavior functions is solved while the vehicle is operating to determine the values of the decision variables giving the highest summation of scores. In a preferred method, an optimal structure for the behavior functions and summation solution is taught. The vehicle is then guided in accordance with the determined decision variable values.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein:

FIG. 5 is the algorithm for finding the shortest path.

DESCRIPTION OF THE PREFERRED EMBODIMENT

Figure 1:
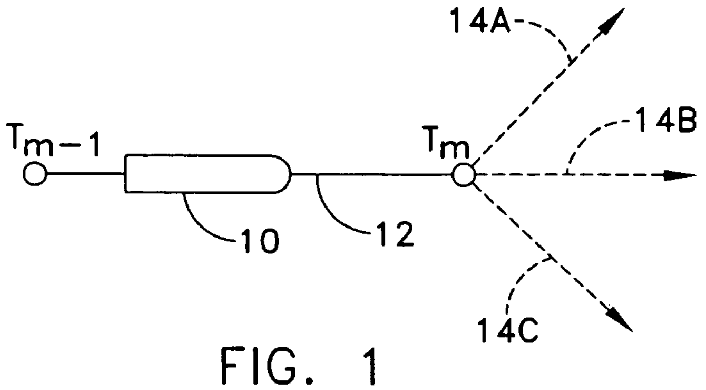
FIG. 1 is a diagram of the basic vehicle navigation problem.

This invention sets up a control system for a vehicle 10 moving through time and space, where periodically, at fixed time intervals, a decision is made as to how to next control the vehicle. FIG. 1 shows the vehicle 10 traveling along a path 12 at times $T_{m-1}$ to $T_m$. Before expiration of the time interval between $T_{m-1}$ and $T_m$, vehicle 10 must decide its next course and speed. Some of the multiplicity of course choices are represented by dashed lines 14A, 14B and 14C.

Figure 2:
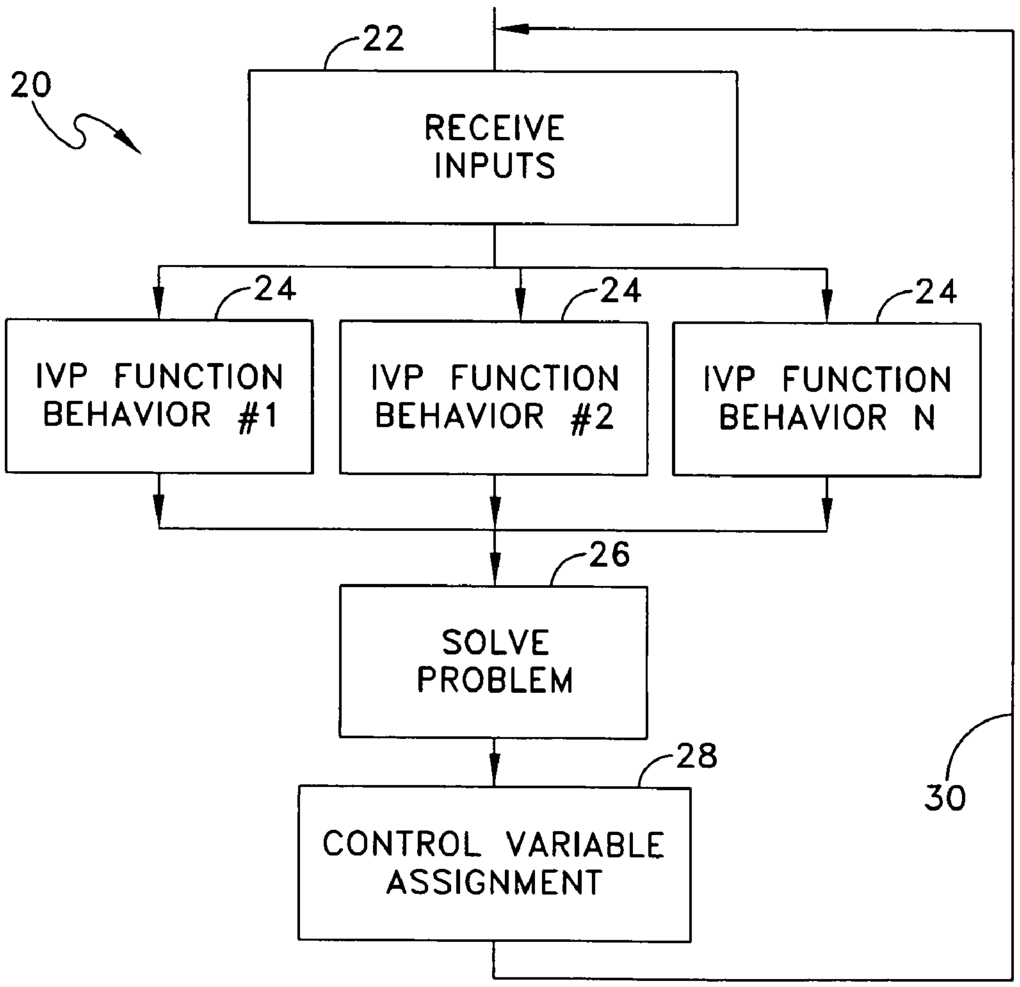
FIG. 2 is a flow chart of the vehicle navigation system.

The vehicle control loop 20 is shown as FIG. 2. At the start of the control loop 20, the vehicle receives environmental and database inputs as identified in step 22. This information is transferred to a plurality of behavior functions 24 that are set up as interval programming (IvP) functions for each individual behavior of the vehicle. Each behavior function 24 has access to the information in the environment from step 22 that is relevant in building its IvP function. Each IvP function is defined over a common decision space, where each decision precisely spells out the next action for the vehicle 10 to implement starting at time $T_m$. The behavior functions 24 can be weighted to give preferences to certain behaviors. In step 26, the behavior functions are solved. Each iteration of this control loop involves the building interval programming functions in step 24 and solving this interval programming problem in step 26. Generic solution of an interval programming problem is discussed in U.S. patent application Ser. No. 10/631,527, A MULTI-OBJECTIVE OPTIMIZATION METHOD, which is incorporated by reference herein. Solution can be performed by formulating the problem as a summation of the weighted behavior functions. Solutions to the behavior functions are known, so the control system can find the optimal control variables by searching through the variables to find the maximum of this summation. This solution results in control variables for vehicle navigation. These control variables are assigned to the vehicle for navigation in step 28. The algorithm is then iterated in loop 30.

Figure 3:
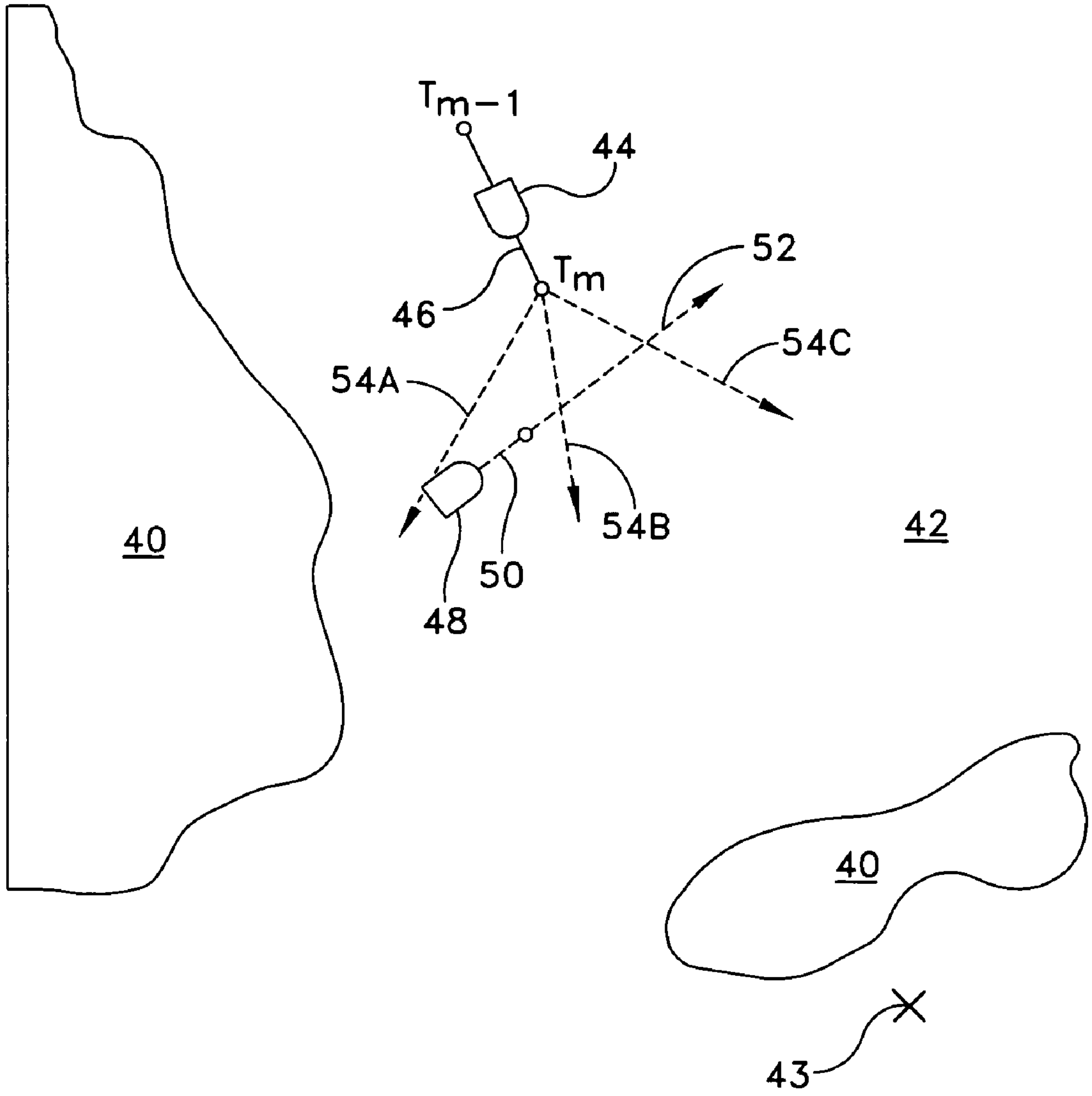
FIG. 3 is a diagram showing the vehicle navigation problem applied to marine vehicles.

In the following text and as shown in FIG. 3, the environment, decision space, and behaviors are described for the application of this technology to marine vehicle navigation. The rationale for using the decision variables chosen here is also discussed. The information that composes the vehicle's relevant environment can be divided into the following four groups: a) bathymetry data, b) destination information, c) ownship position information, and d) contact position information. The bathymetry data represents an assumed map of the environment, telling us what is reachable from where, and at which depths. This includes land 40, ocean 42 and a destination 43. Destination 43 is simply given as latitude, longitude pair, $d_{LAT}$, $d_{LON}$. The vehicle of interest 44 is hereinafter referenced as ownship 44. The position information for ownship 44 is given by the terms $as_{LAT}$ and $os_{LON}$. This is the expected vehicle 44 position at time $T_m$, based on its position at time $T_{m-1}$ and the choice of course 46 and speed executed at $T_{m-1}$. Likewise, the position for a contact 48 is given by $cn_{LAT}$ and $cn_{LON}$, based on the contact's observed course 50 and speed at time $T_{m-1}$. In addition, the terms $cn_{CRS}$ and $cn_{SPD}$ indicate the expected course 52 and speed of the contact 48 at time $T_m$, which is simply the previous course and speed.

During the time interval $[T_{m-1}; T_m]$, the contact 48 is assumed to be on a straight linear track. The calculated ownship maneuver 54A, 54B or 54C would still be carried out regardless of a change in course or speed made by the contact 48 in this time interval. Should such a change occur, the new $cn_{CRS}$ and $cn_{SPD}$ would be noted, the next $cn_{LAT}$ and $cn_{LON}$ calculated, and the process of determining the maneuver at time $T_{m+1}$ begun. The implementation of a tight control loop, and the willingness to repeatedly reconsider the next course of action, ensures that the vehicle 44 is able to quickly react to changes in its perceived environment.

In application to a marine vehicle, the following three decision variables are used to control the vehicle 44: $x_c$=course, $x_s$=speed, and $x_t$=time. They are summarized, with their corresponding domains and resolutions in the Table, below.

| Name | Meaning | Domain | Resolution |
|---|---|---|---|
| $x_c$ | Ownship course starting at time | $T_m$ [0; 359] | 1 degree |
| $x_s$ | Ownship speed starting at time | $T_m$ [0; 30] | 1 knot |
| $x_t$ | Intended duration of the next ownship leg | [1; 90] | 1 minute |

The selection of these three decision variables, and the omission of others, reflects a need to present both a sufficiently simple scenario here, as well as a sufficiently challenging motion planning problem. The omission of variables for controlling vehicle depth, for example, may seem strange since we are focusing on marine vehicles. However, the five objective functions focus on using the interval programming to solve the particularly challenging problem of shortest/quickest path navigation in the presence of moving obstacles.

Although reasoning about vehicle depth is critically important for successful autonomous undersea vehicle operation, none of the objective functions we implement here involve depth because of the added processing complexity. In the scenario described, it is assumed that the depth remains fixed at a preset level. The same holds true for other important control variables, namely the ones that control the rate of change in course, speed or depth. Again for the sake of simplicity, it is assumed that a course or speed change will take place at some reasonable rate. Alternatively, we can regard such maneuvers as happening instantaneously, and include the error that results from this erroneous assumption into general unpredictability of executing an action in a world with limited actuator precision. Certainly, the decision space will grow in size and complexity as more realistic scenarios are considered.

Even when limited to the three variables above, with their domains and resolutions, the decision space contains 360×31×90=1,004,400 elements. By comparison, none of the decision spaces considered by the prior art contained more than 1,000 elements, even if those decision spaces were composed as the Cartesian product of their variable domains. Future versions of this invention may consider depth, course change rate, speed change rate, and other decision variables.

Accordingly, this invention provides behaviors for: Safest Path, Shortest Path, Quickest Path, Boldest Path, and Steadiest Path. Other behaviors may be developed for this application taking into account other system information.

The objective of the safest path behavior is to prevent ownship 44 from coming dangerously close to a particular contact 48, and is defined over the three decision variables $x_c$, $x_s$, and $x_t$. We describe how to build an IvP function, $f_{IvP}(x_c; x_s; x_t)$, based on an underlying function, $f_{CPA}(x_c; x_s; x_t)$. The latter function is based on the closest point of approach, (CPA), between the two vehicles during a maneuver, $[x_c; x_s; x_t]$, made by ownship 44. This function is calculated in a three step process:

[1] Determine the point in time when the closest point of approach occurs, $x'_t$.

[2] Calculate the distance between vehicles at this time $x'_t$.

[3] Apply a utility metric to this distance.

After discussing how $f_{CPA}(x_c; x_s; x_t)$ is calculated, the creation of $f_{IvP}(x_c; x_s; x_t)$ from this function is discussed.

To calculate $f_{CPA}(x_c; x_s; x_t)$, we first need to find the point in time, $x'_t$, in the interval $[0; x_t]$, when the CPA occurs. To do this, we need expressions telling us where ownship 44 and the contact 48 are at any point in time, as well as an expression for their relative distance. Recall that at time, $T_m$, ownship will be at a certain relative position to the contact, and after a particular maneuver, given by $[x_c; x_s; x_t]$, will be at a new point in the ocean and at a new relative position. For ownship, the new latitude and longitude position is given by:

$$f_{LAT}(x_c;x_s;x_t)=(x_s)(x_t)\cos(x_c)+OS_{LAT} \tag{1}$$

$$f_{LON}(x_c;x_s;x_t)=(x_s)(x_t)\sin(x_c)+OS_{LON} \tag{2}$$

The resulting new contact position is similarly given by the following two functions:

$$g_{LAT}(x_t)=\cos(cn_{CRS})(cn_{SPD})(x_t)+cn_{LAT} \tag{3}$$

$$g_{LON}(x_t)=\sin(cn_{CRS})(cn_{SPD})(x_t)+cn_{LON} \tag{4}$$

The latter two functions are defined only over $x_t$ since the contact's course and speed are assumed not to change from their values of $cn_{CRS}$ and $cn_{SPD}$. Note these four functions ignore earth curvature. The distance between ownship and the contact, after a maneuver $[x_c; x_s; x_t]$ is expressed as:

$$\text{dist}^2(x_c;x_s;x_t)=(f_{LAT}(x_c;x_s;x_t)-g_{LAT}(x_t))^2+(f_{LON}(x_c;x_s;x_t)-g_{LON}(x_t))^2. \tag{5}$$

Barring the situation where the two vehicles are at identical course and speed, the CPA is at a unique minimum point in the above function. We find this stationary point by expanding this function, collecting like terms, and taking the first derivative with respect to $x_t$, setting it to zero, and solving for $x_t$. By expanding and collecting like terms we get:

$$\text{dist}^2(x_c;x_s;x_t)=k_2x_t^2+k_1x_t+k_0 \tag{6}$$

where $$k_2=\cos^2(x_c)\cdot x_s^2-2\cos(x_c)\cdot x_s\cdot\cos(cn_{CRS})\cdot cn_{SPD}+\cos^2(cn_{CRS})\cdot cn_{SPD}^2+\sin^2(x_c)\cdot x_s^2-2\sin(x_c)\cdot x_s\cdot\sin(cn_{CRS})\cdot cn_{SPD}+\sin^2(cn_{CRS})\cdot cn_{SPD}^2$$

$$k_1=2\cos(x_c)\cdot x_s\cdot os_{LAT}-2\cos(x_c)\cdot x_s\cdot cn_{LAT}-2os_{LAT}\cdot\cos(cn_{CRS})\cdot cn_{SPD}+2\cos(cn_{CRS})\cdot cn_{SPD}\cdot cn_{LAT}+2\sin(x_c)\cdot x_s\cdot os_{LON}-2\sin(x_c)\cdot x_s\cdot cn_{LON}-2os_{LON}\cdot\sin(cn_{CRS})\cdot cn_{SPD}+2\sin(cn_{CRS})\cdot cn_{SPD}\cdot cn_{LON} \tag{7}$$

$$k_0=os_{LAT}^2-2os_{LAT}\cdot cn_{LAT}+cn_{LAT}^2-2os_{LON}\cdot cn_{LON}+cn_{LON}^2$$

From this we have:

$$\text{diSt}^2(x_c;x_s;x_t)'=2k_2x_t+k_1. \tag{8}$$

We note that the distance between two objects cannot be negative, so the point in time, $x_t'$, when $\text{dist}^2(x_c; x_s; x_t)$ is at its minimum is the same point where $\text{dist}(x_c; x_s; x_t)$ is at its minimum. Also, since there is no "maximum" distance between two objects, a point in time, $x_t'$, where $2k_2x_t+k_1=0$ must represent a minimum point in the function $\text{dist}(x_c; x_s; x_t)$. Therefore $x_t'$ is given by:

$$x_t' = \frac{-k_1}{2k_2}. \tag{9}$$

If $x_t'<0$, meaning the closest point of approach occurred prior to the present, we set $x_t=0$, and if $x_t'>x_t$, we set $x_t'=x_t$. When ownship and the contact have the same course and speed, i.e., $x_c=cn_{CRS}$ and $x_s=cn_{SPD}$, then $k_1$ and $k_2$ equal zero, and $x_t'$ is set to zero, since their relative distance will not change during the time interval $[0; x_t]$.

Having identified the time, $x_t'$, at which the closest point of approach occurs, calculating this corresponding distance is a matter of applying the distance function, given above, to $x_t'$.

$$\text{cpa}(x_c;x_s;x_t)=\text{dist}(x_c;x_s;x_t'). \tag{10}$$

The actual objective function reflecting the safest-path behavior, $f_{CPA}(x_c; x_s; x_t)$, depends on both the CPA value and a utility metric relating how good or bad particular CPA values are with respect to goals of the safest-path behavior. Thus $f_{CPA}(x_c; x_s; x_t)$ will have the form:

$$f_{CPA}(x_c;x_s;x_t)=\text{metric}(\text{cpa}(x_c;x_s;x_t)). \tag{11}$$

We first consider the case where $f_{CPA}(x_c; x_5; x_t)$ represents a "collision-avoidance" objective function. In a world with perfect knowledge and perfectly executed actions, a constraint-based approach to collision avoidance would be appropriate, resulting in $\text{metric}_a(d)$ below, where d is the CPA distance, and −M is a sufficiently large negative number acting as −1. Allowing for error, one could instead use $$metric_a(d) = \begin{cases} -M & \text{if } d = 0 \\ 0 & \text{otherwise} \end{cases} \tag{12}$$

or, $$metric_b(d) = \begin{cases} -M & \text{if } d \le 300 \\ 0 & \text{otherwise} \end{cases} \tag{13}$$

use $\text{metric}_b(d)$ where maneuvers that result in CPA distances of less than 300 yards are treated as "collisions" to allow room for error, or a buffer zone.

Instead, we use a metric that recognizes that this collision safety zone is gray, or fuzzy. Under certain conditions, distances that would otherwise be avoided, may be allowed if the payoff in other goals is high enough. Of course, some distances remain intolerable under any circumstance. Having specified a function to compute the CPA distance and a utility metric based on the CPA distance, the specification of $f_{CPA}(x_c; x_s; x_t)$ is complete. Based on this function, we then build the function $f_{IVP}(x_c; x_s; x_t)$.

Now that $f_{CPA}(x_c; x_s; x_t)$ has been defined, we wish to build a version of $f_{IVP}(x_c; x_s; x_t)$ that closely approximates this function. It is desirable to create as accurate a representation as possible, as quickly as possible, using as few pieces as possible. This in itself is a non-trivial multi-objective problem. Fortunately, fairly naive approaches to building this function appear to work well in practice, with additional room for doing much better given more thought and design effort. To begin with, we create a piecewise uniform version of $f_{IVP}(x_c; x_s; x_t)$. This function gives a score for every possible course, $x_c$; speed, $x_s$; and duration, $x_t$. The score gives a desirability of following these variables in view of potential collision with the contact.

The questions of acceptable accuracy, time, and piece-count are difficult to respond to with precise answers. The latter two issues of creation time and piece-count are tied to the tightness of the vehicle control loop. This makes it possible to work backward from the control loop requirements to bound the creation time and piece-count. However, the control loop time is also application dependent. The most difficult issue is knowing when the function $f_{IVP}(x_c; x_s; x_t)$ is an acceptably accurate representation of $f_{CPA}(x_c; x_s; x_t)$. Although it is difficult to pinpoint, at some point the error introduced in approximating $f_{CPA}(x_c; x_s; x_t)$ with $f_{IVP}(x_c; x_s; x_t)$ becomes overshadowed by the subjectivity involved in $f_{CPA}(x_c; x_s; x_t)$.

Characteristics of different versions of $f_{IVP}(x_c; x_s; x_t)$ can be analyzed experimentally to note when poorer versions begin to adversely affect vehicle behavior. There is a trade off between the number of pieces in the piecewise function, the creation time, and the error associated therewith. With an increasing number of pieces, it has been found that there is a point of diminishing returns where additional pieces have a smaller return in reduced error. An ideal piece count cannot be formulated on each iteration of the control loop; however, enough analysis of the vehicle can allow choice of a piece-count that works sufficiently well in all situations.

The shortest path behavior is concerned with finding a path of minimal distance from the current position of the vehicle $(os_{LAT}; os_{LON})$ to a particular destination $[d_{LAT}; d_{LON}]$. As with the previous behavior, the aim is to produce an IvP function $f_{IVP}(x_c; x_s; x_t)$ that not only indicates which next maneuver(s) are optimal with respect to the behavior's goals, but evaluates all possible maneuvers in this regard. The primary difference between this behavior and the previous behavior, is that here, $f_{IVP}(x_c; x_s; x_t)$ is piecewise defined over the latitude-longitude space rather than over the decision space. The function $f_{IVP}(x_c; x_s; x_t)$ as in other behaviors, is created during each iteration of the control loop, and must be created quickly. In the shortest path behavior, an intermediate function, spath($p_{LAT}$; $p_{LON}$), is created once, off-line, for a particular destination, and gives the shortest-path distance to the destination given a point in the ocean, [$p_{LAT}$; $p_{LON}$]. The creation of spath($p_{LAT}$; $p_{LON}$) is described below. This function in turn is built upon a third function, bathy($p_{LAT}$; $p_{LON}$), which returns a depth value for a given point in the ocean, and is described below.

The function bathy($p_{LAT}$; $p_{LON}$) is a piecewise constant function over the latitude-longitude space, where the value inside each piece represents the shallowest depth within that region. This function is formed in a manner similar to that taught by U.S. patent application Ser. No. 10/631,527, A MULTI-OBJECTIVE OPTIMIZATION METHOD which has been incorporated by reference herein. The "underlying" function in this case is a large file of bathymetry data, where each line is a triple: [$p_{LAT}$; $p_{LON}$; depth]. These bathymetry files can be obtained for any particular region of the ocean from the Naval Oceanographic Office Data Warehouse, with varying degrees of precision, i.e., density of data points.

The primary purpose of the bathy($p_{LAT}$; $p_{LON}$) function is to provide a quick and convenient means for determining if one point in the ocean is directly reachable from another. Consider the example function, bathy($p_{LAT}$; $p_{LON}$), which is an approximation of the bathymetry data. This data can be used in determining whether the proposed destination point is reachable from all points inside a current region, for a given depth. The function spath($p_{LAT}$; $p_{LON}$) is built by using the function bathy($p_{LAT}$; $p_{LON}$) and performing many of the above such queries. The accuracy in representing the underlying bathymetry data is enhanced by using finer latitude and longitude pieces. However, the query time is also increased with more pieces, since all pieces between the two points must be retrieved and tested against the query depth. Actually, just finding one that triggers an unreachable response is sufficient, but to answer that the destination is reachable, all must be tested.) The preferred function bathy($p_{LAT}$; $p_{LON}$) uses a uniform piecewise function.

An equivalent non-uniform function can be constructed by combining neighboring pieces with similar values. Further consolidation can be done if a range of operating depth for the vehicle is known a priori. For example, if the vehicle will travel no deeper than 30 meters, then the function can be simplified, since pieces with depths of 30 and 45 meters are functionally equivalent when the vehicle is restricted to depths less than 30 meters.

The function spath($p_{LAT}$; $p_{LON}$) is a piecewise linear function over the latitude-longitude space, where the value inside each piece represents the shortest path distance to the destination [$d_{LAT}$; $d_{LON}$], given a bathymetry function, bathy ($p_{LAT}$; $p_{LON}$), and a specific operating depth. On a basic level, this function only considers simple linear distance, but it is recognized that one of ordinary skill in the art would consider other factors, such as preferred depth, current flow, and proximity to obstacles with uncertainty in order to provide a more robust implementation. These factors are discussed in the prior art to John Reif and Zheng Sun, "Motion Planning in the Presence of Flows," *Proceedings of the 7th International Workshop on Algorithms and Data Structures* (*WADS*2001), pages 450-461, Brown University, Providence, R.I., August 2001. Volume 2125 of Lecture Notes in Computer Science.

Figure 4:
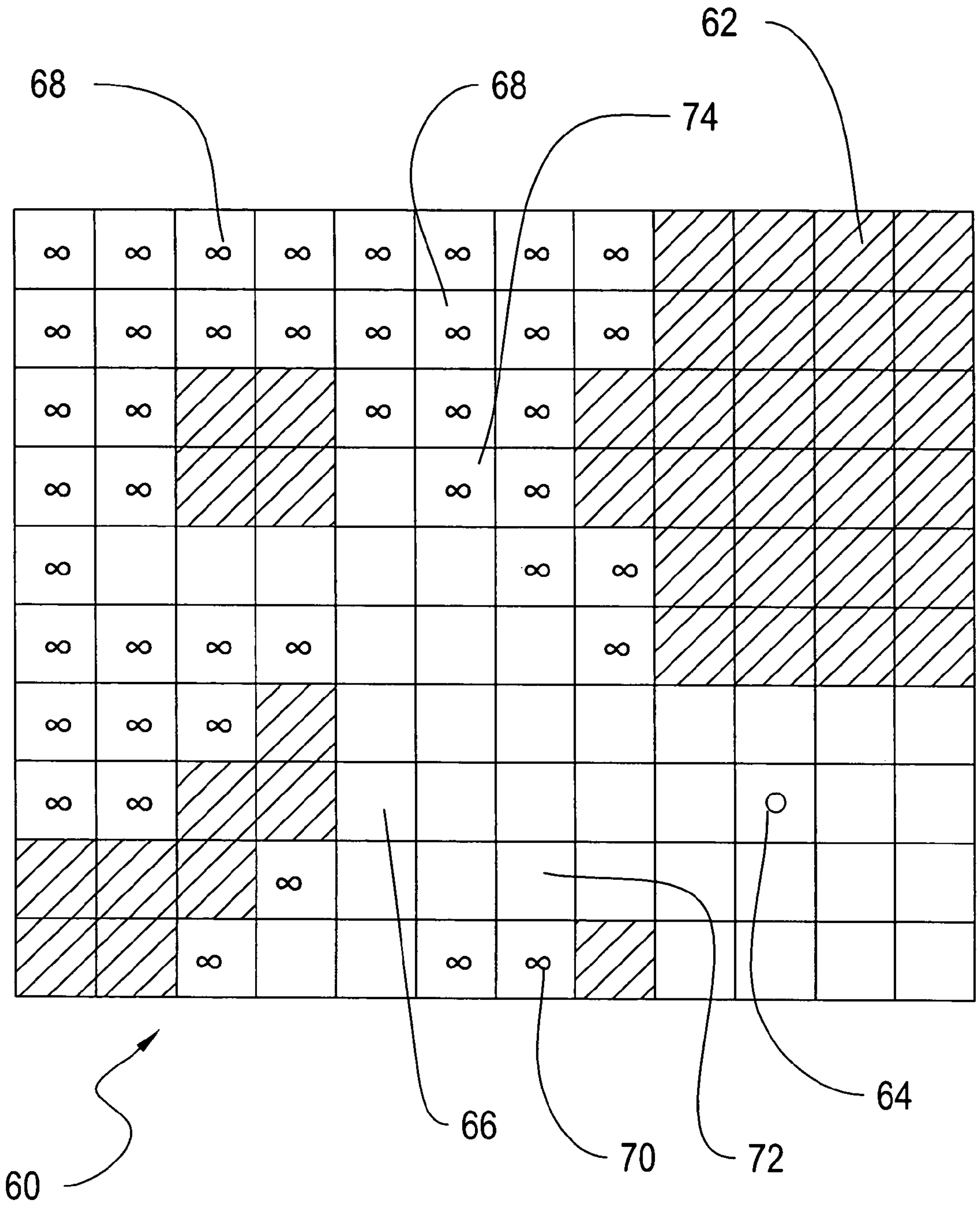
FIG. 4 is a diagram illustrating aspects of the closest point aspect of the shortest path behavior function.

In building spath($p_{LAT}$; $p_{LON}$) for a particular destination and depth, the latitude-longitude space is divided into either free space, or obstacles, based on the bathy($p_{LAT}$; $p_{LON}$) function. A simple case is shown below in FIG. 4. FIG. 4 provides a map 60 of latitude-longitude pieces. Pieces identified by the bathymetry function as being impassable are cross hatched as identified by piece 62. The destination is shown as "o" identified as 64. In the first stage of building spath ($p_{LAT}$; $p_{LON}$), all latitude-longitude pieces are identified such that all interior positions of the piece are reachable to the destination on a single direct linear path. In FIG. 4, these "direct-path" pieces are indicated by the empty pieces 66. The other pieces, such as the pieces identified as 68, are marked with ∞, since their distance to the destination 64 is initially unknown. Choosing these pieces to be uniform was done only for clarity in these examples. The pieces in spath ($p_{LAT}$; $p_{LON}$) and bathy ($p_{LAT}$; $p_{LON}$) are not required to be uniform, and the algorithm provided below is not dependent on uniform pieces.

After the first stage, there exists a "frontier" of pieces identified as 70, each having a directly-reachable neighbor 72 that has a known shortest-path distance. For these frontier pieces 70, one can at least improve the "∞" distance by proceeding through its neighbor 72. But consider the case of the piece identified as 74, where a frontier piece has two such neighbors. Unless an effort is made to properly "orient" the frontier, unintended consequences may occur. Furthermore, even if the correct neighbor is chosen, we can often do better than simply proceeding through the neighbor. This section describes implementation of an all-sources shortest path algorithm. The only value we ultimately care about for each piece is the linear interior function indicating the shortest-path distance for a given interior position. However, the following intermediate terms are useful:

dist($pc_a$, $pc_b$)=Distance between center points of $pc_a$ and $pc_b$.

$pc_a$→dist=Distance from the center point of $pc_a$ to the destination.

$pc_a$→waypt=The next waypoint for all points in $pc_a$.

After the first stage of finding all directly reachable pieces 66, the value of $pc_a$→waypt for such pieces is simply the coordinates of destination point 64, [$d_{LAT}$; $d_{LON}$], and NULL for all other pieces. By keeping the waypoint for each piece, we can reconstruct the actual path that the shortest-path distance is based upon. The basic algorithm is given in FIG. 5. Three subroutine calls are left un-expanded: setDirect Pieces( ), sampleFrontier( ), and refine( ), on lines 0, 3, and 5. The basic idea of the while loop is to continue refining pieces on the frontier until a set amount (in this case 100) of successive refinements fail to exceed a fixed threshold of improvement.

The function sampleFrontier(amt) searches for pairs of neighboring pieces, [$pc_a$, $pc_b$], where one piece could improve its path by simply proceeding through its neighbor. The pairs of pieces are randomly chosen by picking points in the latitude-longitude space. The opportunity for improving $pc_a$ through its neighbor, $pc_b$, is measured by: $opp_a$=$pc_a$→dist−(dist($pc_a$, $pc_b$)+$pc_b$→dist). Each pair of pieces is then placed in a fixed-length priority queue, where the maximum element is a (frontier) pair with the greatest opportunity for improvement. This queue will never be empty but will eventually contain only pairs with little or no opportunity for improvement. There is also no guarantee that the same pair is not in the queue twice.

After a certain amount of sampling is done, the maximum pair is popped from the queue as in line 4 in FIG. 5. The function refine($pc_a$, $pc_b$) is then executed, returning the measure of improvement given by val. The counter, threshCount, is incremented if the improvement is insignificant, eventually triggering the exit from the while-loop. If the improvement in $pc_a$ is significant, it will likely create a good opportunity for improvement in other neighbors of $pc_a$. These neighbors (pairs) are therefore evaluated and pushed into the priority queue. The refine($pc_a$, $pc_b$) function should, at the very least, make the simple improvement of setting the $pc_a$→waypt to an interior point in $pc_b$, e.g. the center point, and the linear function inside $pc_a$ is set to represent the distance to this new way-point, plus the distance from that way-point to the destination. Other refinements can be made that search for shortcuts points along the path from $pc_b$ to its way-point. If such a point is found, it becomes the value of $pc_a$→waypt, and the appropriate linear interior distance function is calculated. The value returned by refine($pc_a$, $pc_b$) is the difference in $pc_a$→dist before and after the function call.

In spath ($p_{LAT}$; $p_{LON}$), the shortest distance for each point is based on a particular set of waypoints composing the shortest path, so the next waypoint is stored with each point in latitude-longitude space. This forms a linked list from which a full set of waypoints can be reconstructed for any given start position.

Once the function spath($p_{LAT}$; $p_{LON}$) has been created for a particular destination and depth, the function $f_{IVP}(x_c; x_s; x_t)$ for a given ownship position can be quickly created. Like bathy($p_{LAT}$; $p_{LON}$) and spath($p_{LAT}$; $p_{LON}$), this function is defined over the latitude-longitude space, but the function $f_{IVP}(x_c; x_s; x_t)$ is defined only over the points reachable within one maneuver. A distance radius is determined by the maximum values for $x_s$ and $x_t$. The objective function, $f_{IVP}(x_c; x_s; x_t)$, produced by this behavior ranks waypoints based on the additional distance, over the shortest-path distance, that would be incurred by traveling through them.

For each piece in $f_{IVP}(x_c; x_s; x_t)$, the linear interior function represents a detour distance calculated using three components. The first two are linear functions in the piece representing the distance to the destination, and the distance to the current ownship position. The third component is simply the distance from the current ownship position to the destination, given by spath($OS_{LAT}$; $OS_{LON}$). Thus, the linear function representing the detour distances for all points [x; y] in a given piece, is given by: $(m_1+m_2)(x)+(n_1+n_2)(y)+b_1+b_2-\text{spath}(OS_{LAT}, OS_{LON})$. A utility metric is then applied to this result to both normalize the function $f_{IVP}(x_c; x_s; x_t)$, and allow a nonlinear utility to be applied against a range of detour distances.

The objective functions built by the shortest path behavior may also reflect alternative paths that closely missed being the shortest, from a given position. For example, the shortest path from positions just south of an island to the destination just north of the island may proceed either east or west depending on the starting position. A north-south line of demarcation can be drawn that determines the direction of the shortest path. When ownship is nearly on this line, the resulting objective function, $f_{IVP}(x_c; x_s; x_t)$, reflects both alternative paths. If the shortest path proceeds east around the island, positions north-west can still be ranked highly due to the alternative, near-shortest path even though these positions represent a significant detour from the true shortest path. The presence of alternatives is important when the behavior needs to cooperate with another behavior that may have a good reason for not proceeding east.

The three functions in this behavior are coordinated to allow repeated construction of $f_{IVP}(x_c; x_s; x_t)$ very quickly, since it needs to be built and discarded on each iteration of the control loop.

The bathymetry data is assumed to be stable during the course of an operation. Thus the piecewise representation of this data, bathy($p_{LAT}$; $p_{LON}$), is calculated once, off-line, and its creation is not subjected to real-time constraints. The function spath($p_{LAT}$; $p_{LON}$) is stable as long as the destination and operating depth remain constant.

An implementation of spath($p_{LAT}$; $p_{LON}$) having sufficient speed has been developed. Alternatively, storing previously calculated versions of spath($p_{LAT}$; $p_{LON}$) for different depths or destinations is another viable option. The volatile function, $f_{IVP}(x_c; x_s; x_t)$, can be calculated very quickly since so much of the work is contained in the underlying spath($p_{LAT}$; $p_{LON}$) function. The relationship between these three functions results in the appearance that ownship is performing "dynamic replanning" in cases where the shortest path becomes blocked by another vessel. The result is a behavior that has a strong "reactive" aspect because it explicitly states all its preferred alternatives to its most preferred action. It also has a strong "planning" aspect since its action choices are based on a sequence of perhaps many actions.

In transiting from one place to another as quickly as possible, proceeding on the shortest path may not always result in the quickest path. If the shortest path is indeed available at all times to the vehicle, at the vehicle's top speed, then the shortest path will indeed be the quickest. Other issues, such as collision avoidance with other moving vehicles, may create situations where the vehicle may need to leave the shortest path to arrive at its destination in the shortest time possible.

Concerning the boldest path behavior, sometimes there is just no good decision or action to take. But this doesn't mean that some are not still better than others. By including time, $x_t$, as a component of our action space, we leave open the possibility for a form of procrastination, or self-delusion. If the vehicle's situation is doomed to be less than favorable an hour into the future, no matter what, actions that have a time component of only a minute appear to be relatively good. By narrowing the window into the future, it is difficult to distinguish which initial actions may actually lead to a minimal amount of damage in the future. The boldest-path behavior therefore gives extra rating to actions that have a longer duration, i.e., higher values of $x_t$. This is not to say that choosing an action of brief duration, followed by different one, can sometimes be advantageous.

Other relevant behavior functions and decision variables can be determined in view of the mission of the vehicle. These techniques could also be applied to commercial autonomous vehicles.

Although we seek the optimum $(x_c; x_s; x_t)$ at each iteration of the vehicle control loop, there is a certain utility in maintaining the vehicle's current course and speed. In practice, when ownship is turning or accelerating, it not only makes noise, but also destabilizes its sensors for a period, making changes in a contact's solution harder to detect. The steady-path behavior implements this preference to keeping a steady course and speed by adding an objective function ranking values of $x_c$ and $x_s$ higher when closer to ownship's current course and speed.

After choosing the behavior equations for the vehicle, these equations are converted to interval functions as taught by the method. The behavior functions are weighted and summed to give an interval programming problem. At each time interval, the vehicle solves the interval programming problem. This can be performed by searching through the behavior functions to determine optimal values of the functions. These optimal values give the best course of action for the vehicle. The vehicle then implements this action and proceeds to formulate the next interval programming problem.

In light of the above, it is therefore understood that within the scope of the appended claims, the invention may be practiced otherwise than as specifically described.

What is claimed is:

1. A method for autonomously controlling a vehicle comprising:

establishing decision variables for maneuvering the vehicle;

establishing behavior functions associated with a behavior of the vehicle including at least two of safest path, shortest path, quickest path, boldest path, and steadiest path as a function of at least one of the established decision variables, each behavior function giving a score indicating the desirability of engaging in the associated behavior wherein said established behavior functions are piecewise defined functions, each behavior function being dependent on at least one of the established decision variables, said behavior function being based on an underlying expression, each behavior function having a plurality of pieces, each piece relatable to an interior function having a piece maximum value, each behavior function having only one piece for each combination of decision variable values;

establishing weights of the established behavior functions to give weighted behavior functions;

solving a summation of the weighted behavior functions while the vehicle is operating to determine the values of the decision variables giving the highest summation; and guiding the vehicle in accordance with the determined decision variable values.

2. The method of claim 1 further comprising the step of obtaining previously recorded variables from a database while the vehicle is operating, and at least one of said established behavior functions being dependent on said previously recorded variables.

3. The method of claim 1 wherein said step of solving a summation further comprises searching through the decision variable values to find the values of the decision variables that maximize the summation of the weighted behavior functions.

4. The method of claim 1 wherein the vehicle is an unmanned underwater vehicle.

5. The method of claim 1 further comprising the step of obtaining environmental variables while the vehicle is operating, and at least one of said established behavior functions being dependent on said obtained environmental variables.

6. The method of claim 5 wherein the step of obtaining environmental variables includes detecting other vehicles and the established behavior functions are responsive to detected vehicles.

7. The method of claim 6 wherein the established behavior functions includes safest path.

8. The method of claim 7 wherein calculation of the safest path behavior function includes:

determining the time of the closest point of approach between the vehicle and detected other vehicle;

determining the closest point of approach between the vehicle and the detected other vehicle; and applying a utility metric to the closest point of approach distance to give the score for the safest path behavior function.

9. The method of claim 1 wherein said decision variables include course, speed and action duration.

10. A method for autonomously controlling a vehicle comprising:

establishing decision variables for maneuvering the vehicle, said decision variables including course, speed and action duration;

establishing behavior functions associated with a behavior of the vehicle including at least two of safest path, shortest path, quickest path, boldest path, and steadiest path as a function of at least one of the established decision variables, each behavior function giving a score indicating the desirability of engaging in the associated behavior;

establishing weights of the established behavior functions to give weighted behavior functions;

solving a summation of the weighted behavior functions while the vehicle is operating to determine the values of the decision variables giving the highest summation; and guiding the vehicle in accordance with the determined decision variable values.

11. The method of claim 10 wherein the vehicle is an unmanned underwater vehicle.

12. The method of claim 10 further comprising the step of obtaining environmental variables while the vehicle is operating, and at least one of said established behavior functions being dependent on said obtained environmental variables.

13. The method of claim 12 wherein the step of obtaining environmental variables includes detecting other vehicles and the established behavior functions are responsive to detected vehicles.

14. The method of claim 13 wherein the established behavior functions includes safest path.

15. The method of claim 14 wherein calculation of the safest path behavior function includes:

determining the time of the closest point of approach between the vehicle and detected other vehicle;

determining the closest point of approach between the vehicle and the detected other vehicle; and applying a utility metric to the closest point of approach distance to give the score for the safest path behavior function.

16. The method of claim 12 further comprising the step of obtaining previously recorded variables from a database while the vehicle is operating, and at least one of said established behavior functions being dependent on said previously recorded variables.

17. The method of claim 16 wherein said established behavior functions are piecewise defined functions, each behavior function being dependent on at least one of the established decision variables such that each behavior function corresponds to a goal, said behavior function being based on an underlying expression, each behavior function having a plurality of pieces, each piece relatable to an interior function having a piece maximum value, each behavior function having only one piece for each combination of decision variable values.

18. The method of claim 17 wherein said step of solving a summation further comprises searching through the decision variable values to find the values of the decision variables that maximize the summation of the weighted behavior functions.

* * * * *